United States Patent [19]

White

[11] Patent Number: 4,628,513
[45] Date of Patent: Dec. 9, 1986

[54] TUNABLE INDIUM UV ANTI-STOKES RAMAN LASER

[75] Inventor: Jonathan C. White, Stanford, Calif.

[73] Assignee: AT&T Bell Laboratories, Murray Hill, N.J.

[21] Appl. No.: 768,414

[22] Filed: Aug. 22, 1985

Related U.S. Application Data

[63] Continuation-in-part of Ser. No. 535,808, Sep. 26, 1983, abandoned.

[51] Int. Cl.[4] .............................................. H01S 3/30
[52] U.S. Cl. ......................................... 372/3; 372/20; 372/39; 307/425
[58] Field of Search ............... 372/3, 55, 20; 307/425, 307/426

[56] References Cited

U.S. PATENT DOCUMENTS

| | | | |
|---|---|---|---|
| 3,746,860 | 7/1973 | Shatas et al. | 250/402 |
| 3,748,475 | 7/1973 | Shatas et al. | 250/502 |
| 3,766,004 | 10/1973 | Roberts et al. | 176/1 |
| 3,953,732 | 4/1976 | Oron et al. | 250/287 |
| 3,972,008 | 7/1976 | Fletcher et al. | 307/426 |
| 3,991,387 | 11/1976 | Waynant | 372/84 |
| 4,213,060 | 7/1980 | Byer et al. | 307/426 |
| 4,218,628 | 8/1980 | Harris | 307/426 |
| 4,254,348 | 3/1981 | Stappaerts | 307/426 |
| 4,318,057 | 3/1982 | Buchwald et al. | 372/70 |
| 4,327,337 | 4/1982 | Liu | 372/3 |
| 4,504,949 | 3/1985 | White | 372/3 |

OTHER PUBLICATIONS

White et al., "Tunable, 178-nm Iodine Anti-Stokes Raman Laser", Optics Letts., vol. 7, No. 5, May 1982.
Burnham, "Atomic Indium Photo Dissociation Laser at 451 nm", Appl. Phys. Lett., vol. 30, No. 3, Feb. 1, 1977.
"Observation of Stimulated . . . ", Physical Review Letters, vol. 33, No. 4, 1974, Carman et al., pp. 190–193.
"Anti-Stokes Raman Laser", Physical Review A, vol. 25, Feb. 1982, White et al., pp. 1226–1229.
"Tunable, 178 nm Iodine . . . ", Optical Letters, vol. 7, May 1982, White et al., pp. 204–206.

Primary Examiner—Leon Scott, Jr.
Attorney, Agent, or Firm—Wendy W. Koba

[57] ABSTRACT

An anti-Stokes Raman laser is disclosed which is tunable in the ultraviolet (UV) by utilizing ground state neutral indium atoms as the lasing medium. A photodissociator is utilized to create a metastable indium population and a tunable dye laser is subsequently used to pump the metastable population to an intermediate level. Stimulated anti-Stokes Raman lasing occurs from this intermediate level, thereby generating anti-Stokes Raman emission at 410 nm. Since the dye laser is tunable, the Raman lasing output is tunable over a comparable range.

6 Claims, 3 Drawing Figures

TUNABLE INDIUM UV ANTI-STOKES RAMAN LASER

CROSS-REFERENCE TO RELATED APPLICATION

This application is a continuation-in-part of my copending application, Ser. No. 535,808, filed Sept. 26, 1983, abandoned.

BACKGROUND OF THE INVENTION

1. Field of the Invention

The present invention relates to a tunable anti-Stokes Raman laser (ASRL) and, more particularly, to a tunable anti-Stokes Raman laser capable of generating ultraviolet (UV) ASRL emission in a medium of inverted neutral indium atoms.

2. Description of the Prior Art

An anti-Stokes Raman laser may be defined as stimulated anti-Stokes Raman emission induced by a pump laser between two levels of the same parity in which a population inversion exists between the upper and lower Raman states. Such laser devices are particularly attractive since they are tunable by tuning the pump laser. Additionally, since the upper Raman state is often a metastable level, large inversion densities and high anti-Stokes output energies are possible. Early work in this area is reported in an article entitled "Observation of Stimulated Anti-Stokes Raman Scattering in Inverted Atomic Iodine", by R. L. Carman et al appearing in *Physical Review Letters*, Vol. 33, No. 4, July 22, 1974, at pp. 190–193. As described therein, measurable gain in inverted I atoms may be obtained, where the I*($5p^52P°_{\frac{1}{2}}$) state is populated by flash photolysis of trifluoromethliodide ($CF_3I$). The anti-Stokes Raman signal may be observed by pumping this inversion with the fundamental of a Nd:YAG (yttrium aluminum garnet) laser at 1.06 $\mu$m and probing with a broadband dye laser. The article goes on to state, however, that superfluorescent emission at the nonresonant anti-Stokes wavelength was not observed during these experiments.

Previously, anti-Stokes Raman lasers have been constructed by the present inventor based upon metastable population inversion in three atomic species, namely thallium, iodine, and bromine, where such work is disclosed in U.S. Pat. Nos. 4,486,884, 4,504,949, and Ser. No. 474,566, previously issued to the present inventor and assigned to the present assignee. Various articles have also been published which relate to this previous work, where two of these references are article entitled "Anti-Stokes Raman Laser", by J. C. White et al appearing in *Physical Review A*, Vol. 25, at pp. 1226–1229 and "Tunable, 178 nm Iodine Anti-Stokes Raman Laser", by J. C. White et al appearing in Optical Letters, Vol. 7, May 1982, at pp. 204–206. Optical Letters, Vol. 7, May 1982, at pp. 204–206. These above-cited articles describe experiments which have demonstrated several of the attractive features of the anti-Stokes Raman laser concept, including large density metastable storage, long population storage times, tunability of the upconverted anti-Stokes laser, and high conversion efficiency.

U.S. Pat. No. 3,991,387 issued to R. W. Waynant on Nov. 9, 1976, discloses a method of synchronous generation and amplification of tunable VUV laser radiation. The Waynant system uses a flat plate electrical transmission discharge system as a combination radiation generating pump laser ($N_2$ laser) and a short wavelength amplifier. One channel generates the $N_2$ pump laser which excites a pair of dye cells generating two tunable dye laser frequencies in the near UV. The two frequencies are made co-linear and passed into a gas or vapor cell to additively produce a resultant vacuum ultraviolet signal. The vacuum ultraviolet signal is transmitted to a second channel where it is injected into the second channel simultaneous with gain in the flat plate electrical system. The signal is amplified sufficiently that additional mixing can take place. A necessary feature of this arrangement, however, is the utilization of two frequencies in the near UV to generate the VUV radiation. An alternative arrangement for generating VUV radiation is disclosed in U.S. Pat. No. 4,218,628 issued to S. E. Harris on Aug. 19, 1980. In the Harris arrangement, spontaneous anti-Stokes scattering from an atomic populations stored in a metastable level is utilized to generate the VUV radiation.

All of the above-described research has dealt with the creation of an anti-Stokes Raman laser from an ionic species, where an initial step is needed in the process to create an ionic population from the ground state neutral atoms.

SUMMARY OF THE INVENTION

The present invention relates to a tunable anti-Stokes Raman laser and, more particularly, to a tunable anti-Stokes Raman laser capable of generating ultraviolet (UV) anti-Stokes Raman emission in a medium of inverted neutral indium atoms.

It is an aspect of the present invention to provide a means for creating anti-Stokes Raman lasing in indium, where indium is a convenient medium for the upconversion of a variety of excimer laser sources further into the UV spectral region.

A further aspect of the present invention is to employ a pumping laser at approximately 451 nm, thereby greatly decreasing the virtual detuning to an intermediate Raman level, where exact focusing to 451 nm is not necessary in accordance with the present invention.

Yet another aspect of the present invention is to provide a population inversion to a metastable state, instead of a dipole-allowed state, since the metastable population may be stored over a long period of time and then rapidly extracted with an intense laser pump.

Other and further aspects of the present invention will become apparent during the course of the following description and by reference to the accompany drawings.

DETAILED DESCRIPTION

Anti-Stokes Raman lasing emission is achieved in the present invention in a medium of inverted indium (In) atoms. Indium is an attractive candidate for anti-Stokes studies since the structure of its electric dipole transitions is very similar to thallium, which has been utilized in the past as a Raman lasing medium. Also, indium has potential as a convenient medium for the upconversion of a variety of excimer laser sources further into the UV spectral region. For the purposes of the present discussion, InI is utilized as the initial medium. However, any indium compound which can be dissociated to provide a metastable In* population may be employed in association with the present invention.

Figure 2:
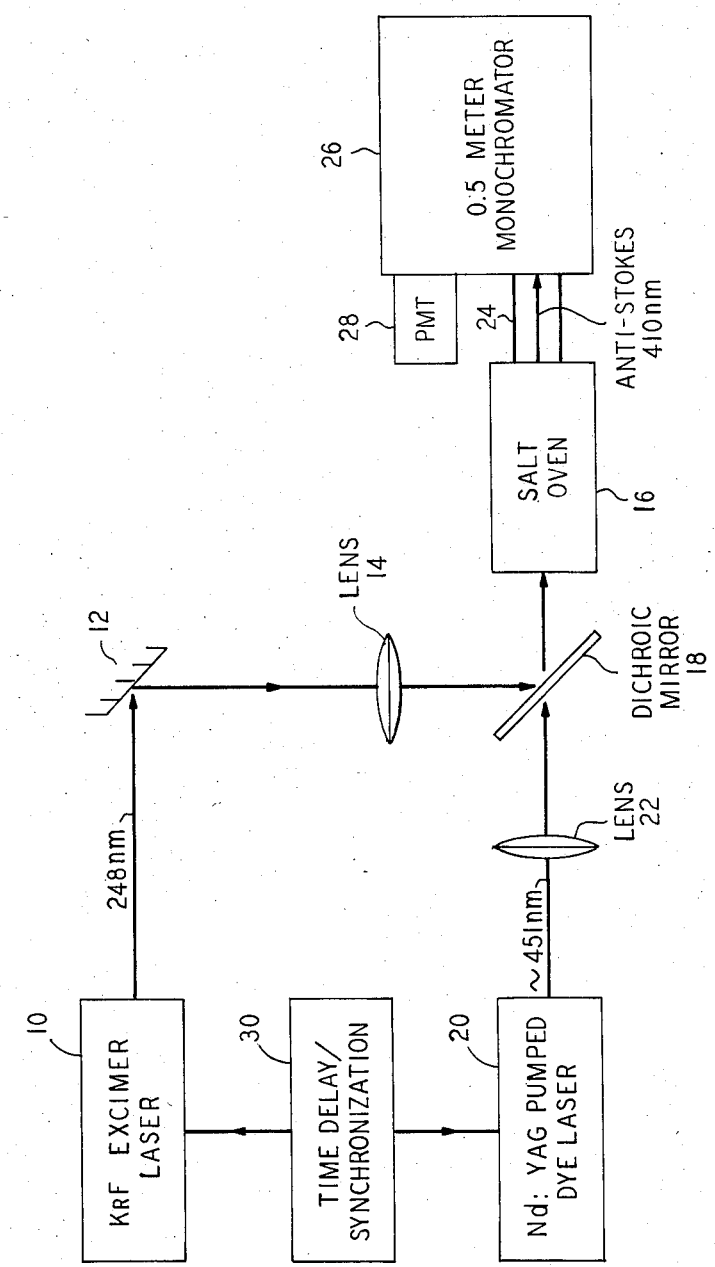
FIG. 2 illustrates a block diagram of an exemplary arrangement capable of producing anti-Stokes Raman lasing in accordance with the present invention.

In accordance with the present invention, metastable In* ($5p^2P°_{3/2}$) population inversion is created by photodissociation of InI using 248 nm photons from a KrF excimer laser, where this process is discussed in detail in association with FIG. 2. The pathway for the reaction in the present invention is:

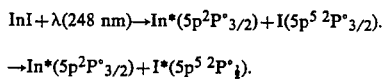

$$InI + \lambda(248\ nm) \rightarrow In^*(5p^2P°_{3/2}) + I(5p^5\ ^2P°_{3/2}).$$

$$\rightarrow In^*(5p^2P°_{3/2}) + I^*(5p^5\ ^2P°_{\frac{1}{2}}).$$

Figure 1:
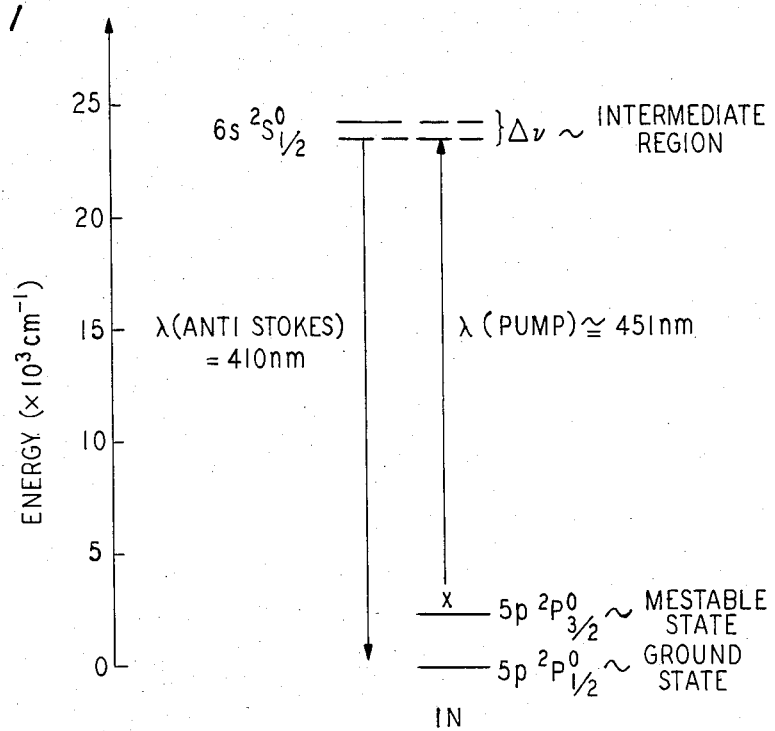
FIG. 1 illustrates the pertinent energy levels for an exemplary anti-Stokes Raman lasing from inverted In atoms.

A schematic energy level diagram for In illustrating the Raman process of the present invention is illustrated in FIG. 1. Absorption of a pumping photon near 451 nm couples both the initial In* metastable and ground states through the $6s^2S_{\frac{1}{2}}$ intermediate state, resulting in stimulated emission at 410 nm. The steady state anti-Stokes Raman gain cross section, $\sigma_R$, may be calculated using a near resonant, three level approximation, shown in equation (1) to be $$\sigma_R = (c^4 f_1 f_2 \gamma_R)/(32\pi^3 \epsilon_o^2 m^2 h c^2 \nu_1 \nu_2 (\Delta\nu)^2 \gamma) \quad (1)$$

where $f_1$ and $f_2$ are the oscillator strengths for the electric dipole transition connecting the initial and final states to the intermediate Raman level, $\nu_1$ and $\nu_2$ are the respective frequencies, $\nu_R$ is the anti-Stokes frequency, $\Delta\nu$ is the virtual detuning illustrated in FIG. 1, and $\gamma$ is the Raman linewidth. For In, these values are $f_1 = 0.16$ and $f_2 = 0.14$, $\nu_1 = 6.65 \times 10^{14}\ sec^{-1}$, $\nu_2 = \nu_R = 7.31 \times 10^{14}\ sec^{-1}$, and $\gamma 3.0 = \times 10^{11}\ sec^{-1}$. If the laser pump at 451 nm is tuned near the intermediate state with $\Delta\nu = 10\ cm^{-1}$, the gain cross section is then $\sigma_R = 2.1 \times 10^{-21}\ cm^4/W$. The single pass Raman gain is exp $[N^* \sigma_R I L]$, where $N^*$ is the metastable population inversion density, I is the pump laser intensity, and L is the length of the Raman medium.

An exemplary apparatus capable of performing the above-described process in accordance with the present invention is illustrated in FIG. 2. As shown, a commercially available KrF* excimer laser 10 is utilized to generate the 248 nm radiation necessary to photodissociate the InI and create the metastable population. Approximately 100 mJ of the 248 radiation is reflected off of a mirror 12 and focused through a lens 14, where lens 14 may comprise a CaF$_2$ lens. The focused radiation is subsequently directed into a salt oven 16 by a dichroic mirror 18 which is capable of totally reflecting the 248 nm radiation. In particular, a KrF* laser pulse may be approximately 20 nsec in duration and focused to an area of approximately $3 \times 10^{-2}\ cm^2$ over a 25 cm active zone of salt oven 16.

The tunable dye laser radiation near 451 nm which is needed to pump the In population in accordance with the present invention may be supplied by a Nd:YAG pumped dye laser 20. In particular, this radiation may be generated by pumping a coumarin 450 dye laser-oscillator-amplifier combination with approximately 100 mJ of radiation at 355 nm, the Nd:YAG third harmonic. The output radiation beam at 451 nm from dye laser 20 is subsequently focused through a lens 22 to an area of approximately $1.0 \times 10^{-2}\ cm^2$. The focused beam is subsequently spatially combined with the 248 nm radiation from KrF* excimer laser 10 by dichroic mirror 18 and enters salt oven 16, where salt oven 16 contains the InI ground state neutral atoms. In particular, salt oven 16 may comprise a simple stainless steel oven with cold, unaligned CaF$_2$ windows operated at 350° C., yielding an InI vapor density of $1.2 \times 10^{16}$ atoms/cm$^3$. Argon buffer gas may be utilized over a pressure range from 10–100 Torr to prevent InI vapor condensation on the windows.

The maximum anti-Stokes output energy from salt oven 16 will be observed when pumping laser 20 is tuned to within a few wavenumbers of the In ($6s^2S_{\frac{1}{2}}$) intermediate level. Accounting for anti-Stokes Raman lasing from both ends of oven 16, a total energy of 15 μJ will be observed at the optimum energy level of 410 nm. Since this observed output energy correlates with an In* ($5p^2P_{3/2}^0$) inversion density of about $3.7 \times 10^{14}$ atoms/cm$^3$, the photon conversion efficiency of this exemplary arrangement is approximately 0.25 percent. In accordance with the present invention, the anti-Stokes output will still exist when tuned approximately 35 cm$^{-1}$ to either side of the $6s^2S_{\frac{1}{2}}$ intermediate region, illustrated in FIG. 1, as controlled by tuning the output frequency of dye laser 20. Thus, a tuning range of approximately 70 cm$^{-1}$ exists for exemplary 410 nm Raman laser of the present invention.

The anti-Stokes Raman lasing emission at 410 nm appears as an output of salt oven 16, where in particular it may pass through an evacuated tube 24 and be detected by a 0.5 meter monochromator 26 and a photomultiplier tube 28 arranged as shown in FIG. 2.

In order to achieve the maximum lasing output, the temporal overlap of the 248 nm and 451 nm laser beams is controlled by a time delay/synchronization means 30. Time delay/synchronization means 30 may comprise, for example, a computer programmed precision delayed generator which functions to separately initiate KrF excimer laser 10 and Nd:YAG pumped dye laser 20. In particular, KrF excimer laser 10 is initiated first, thereby allowing the indium compound to be sufficiently dissociated before the pump wave arrives at salt oven 16.

Figure 3:
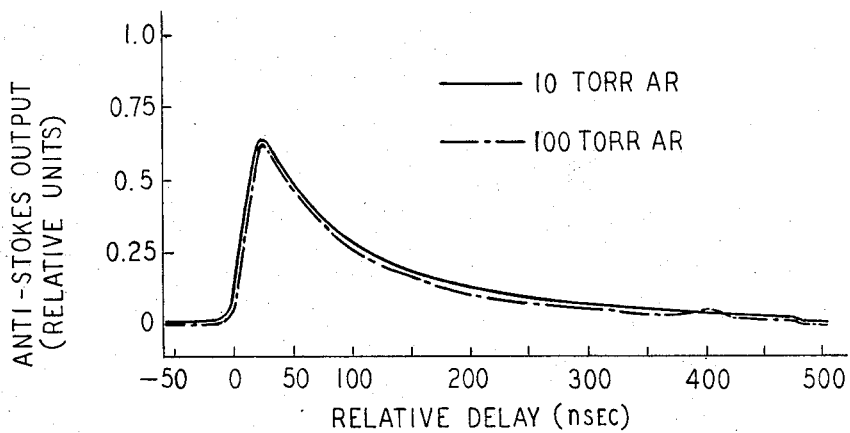
FIG. 3 illustrates laser emission at 410 nm as a function of the relative delay between an 248 nm dissociation pulse and a 451 nm pump pulse.

FIG. 3 illustrates the laser emission output of salt oven 16 at 410 nm as function of the relative delay between the two laser beams, as supplied by synchronization means 30. For the data illustrated in FIG. 3, positive delay corresponds to the 451 pump pulse arriving after the 248 dissociation pulse at salt oven 16. For negative delay, the 451 pump pulse arrives in salt oven 16 prior to the dissociation pulse. Since no In metastable population exists prior to dissociation, the 410 nm Raman lasing output will not be observed, corresponding to the zero laser energy level contained in the graph of FIG. 3. The largest Raman lasing emission is created, as seen by reference to FIG. 3, for a relative signal delay of 20 nsec, due to the 20 nsec long KrF excimer laser pulse. A 410 nm laser may be observed up to a relative delay of approximately 500 nsec. Beyond this time delay, the 410 nm laser emission is abruptly terminated due to an insufficient metastable population. Therefore, the metastable population may be stored over a relatively long period of time and subsequently rapidly extracted with an intense pump laser, allowing the present invention to provide an excellent source of laser radiation in the UV region.

What is claimed is:

1. A tunable anti-Stokes Raman laser comprising
an indium compound lasing medium including at least one ground state, an intermediate state, and at least one metastable state;
photodissociating means for creating a population inversion between said at least one ground state and a metastable state of said indium compound lasing medium; and
anti-Stokes tunable pump means for creating a transition between said metastable state and a predetermined region near said intermediate state of said indium compound lasing medium, thereby creating a Raman lasing output from said predetermined region to said ground state, where said predetermined region is varied to form said tunable anti-Stokes Raman laser.

2. A tunable anti-Stokes Raman laser formed in accordance with claim 1 wherein said laser further comprises
a dichroic mirror capable of spatially overlapping and directing the output of both the photodissociating means and the anti-Stokes pump means towards the indium compound lasing medium; and
time delay/synchronization means for separately initiating both said photodissociating means and said anti-Stokes pump means such that the output from said photodissociating means arrives at the indium compound lasing medium a predetermined time interval before the output of said synchronization means, thereby controlling the intensity of the Raman lasing output of said indium compound lasing medium.

3. A tunable anti-Stokes Raman laser formed in accordance with claim 2 wherein
the photodissociating means comprises a KrF excimer laser responsive to the time delay/synchronization means for providing an emission at a predetermined wavelength capable of photodissociating the indium compound lasing medium.

4. A tunable anti-Stokes Raman laser formed in accordance with claim 3 wherein the KrF excimer laser is capable of producing laser radiation at 248 nm.

5. A tunable anti-Stokes Raman laser formed in accordance with claim 2 wherein
the anti-Stokes pump means comprises a Nd:YAG pumped dye laser responsive to the time delay/synchronization means for providing an emission at a predetermined wavelength capable of moving a metastable population of indium to an intermediate energy level.

6. A tunable anti-Stokes Raman laser formed in accordance with claim 5 wherein the Nd:YAG pumped dye laser is capable of producing laser radiation at approximately 451 nm.

* * * * *